May 18, 1926.

G. L. CRADDOCK

AIR PROPELLED VEHICLE

Filed Oct. 13, 1924

George L. Craddock

Inventor.

May 18, 1926.

G. L. CRADDOCK

AIR PROPELLED VEHICLE

Filed Oct. 13, 1924

George L. Craddock.
Inventor.

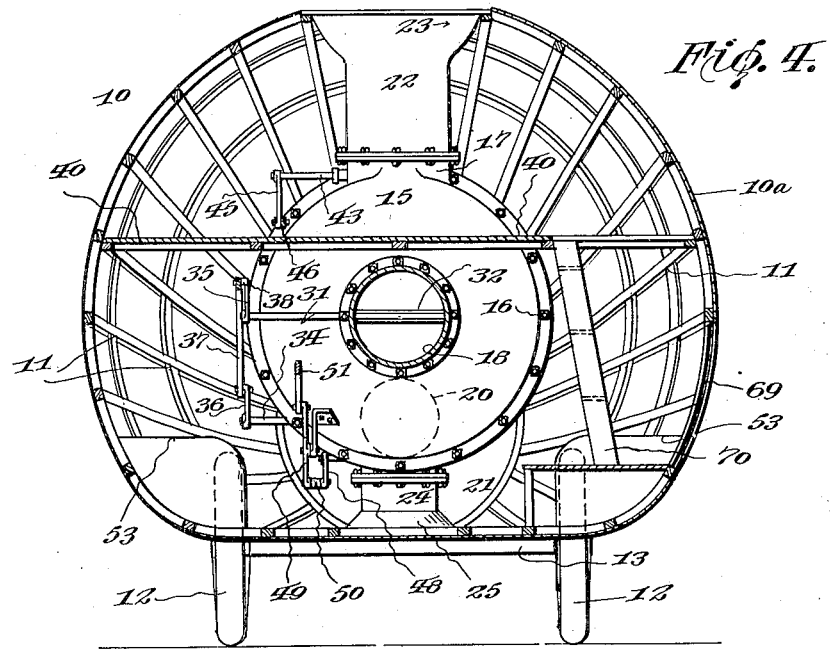
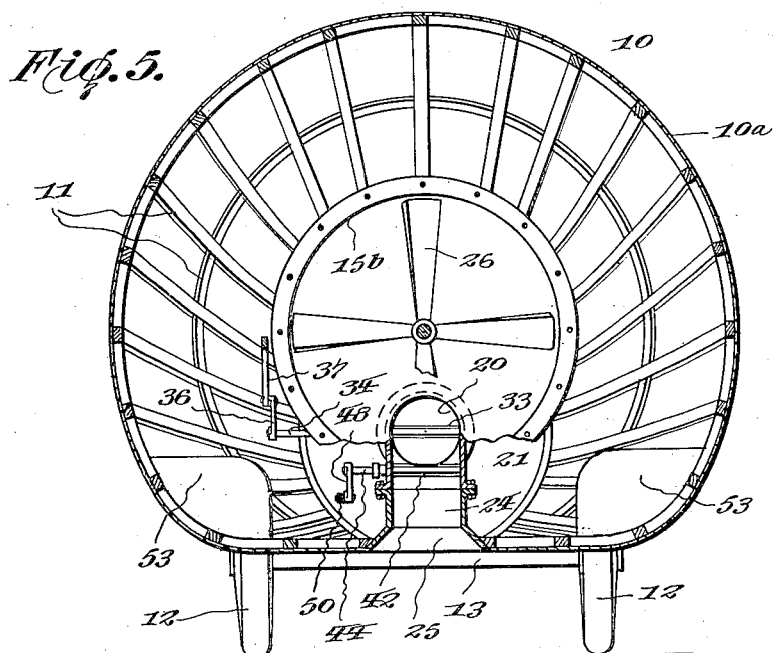

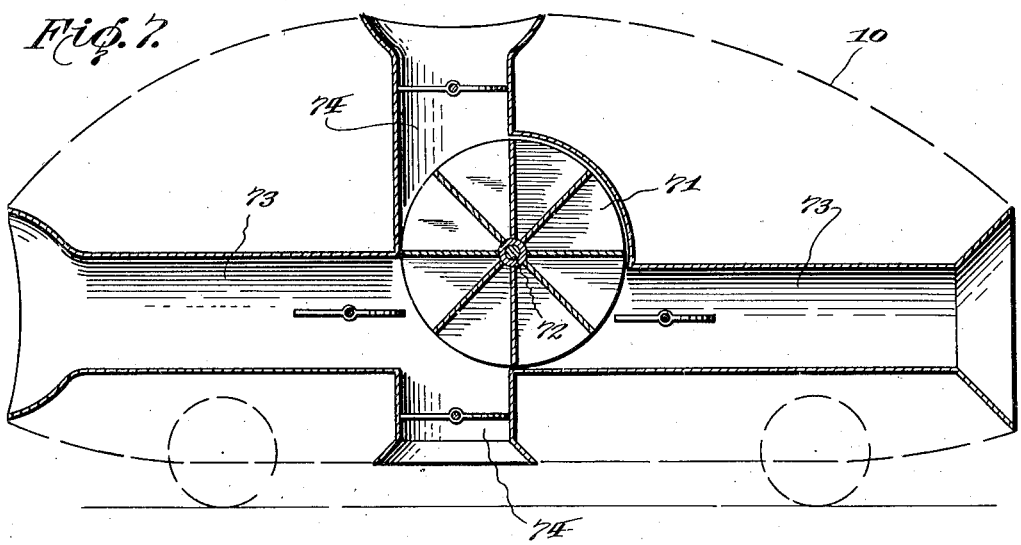
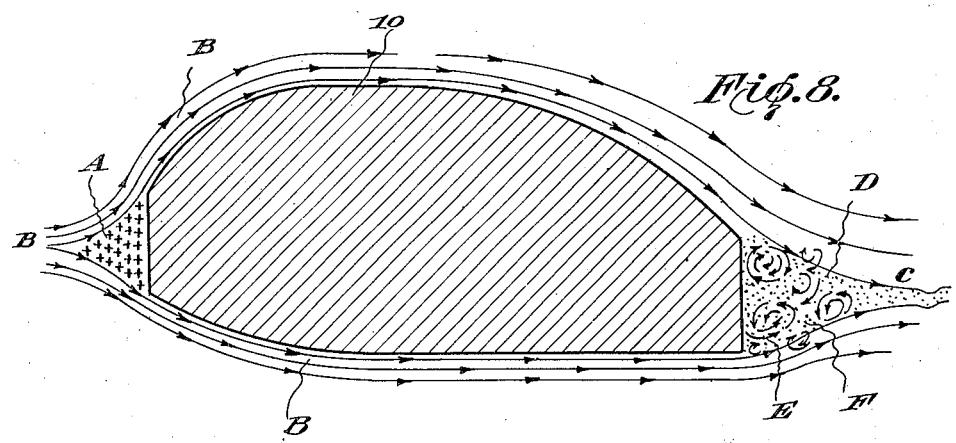
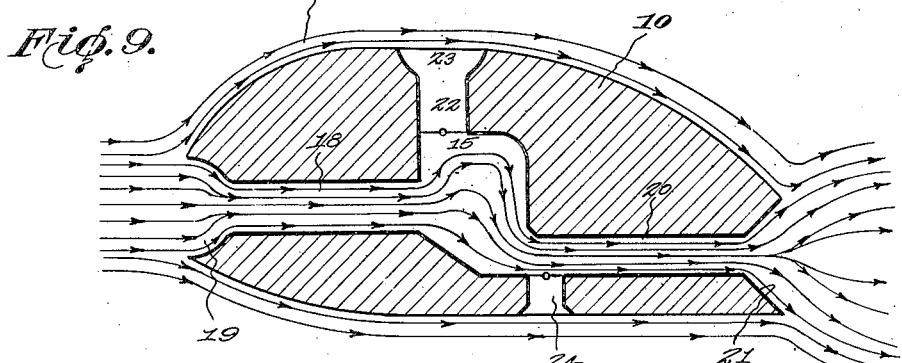

Patented May 18, 1926.

1,585,281

UNITED STATES PATENT OFFICE.

GEORGE L. CRADDOCK, OF WASHINGTON, DISTRICT OF COLUMBIA.

AIR-PROPELLED VEHICLE.

Application filed October 13, 1924. Serial No. 743,449.

My invention relates to improvements in air-propelled vehicles, and more particularly to means for propelling a vehicle either above the surface of the earth, on the land or sea.

The primary object of my invention is the provision and correlation of parts whereby the machine derives its motion, either moving in a substantially horizontal plane, or rising vertically from the earth, by the movement of exceptionally high velocity air currents through the device, compressing them within a restricted area and then releasing the same, thus using the expansion power of compressed air as a motive power.

A further object of my invention is to provide a vehicle capable of rising vertically into the air, or at any desired angle, and a device capable of maintaining itself in a stationary position above the surface of the earth at any desired elevation.

A further object of my invention is to construct a device that will reduce to a minimum the breaking of cohesion between fluid particles, thereby reducing the head-on resistance; said resistance, as is well known, being the force required to break the fluid particles apart, and thus make room for the moving body.

A further object of the invention is to provide means to reduce the drag and break up the partial vacuous space in the rear of the device which is alawys filled with a complicated whirling mass of air, comprising eddy currents.

A still further object of this invention is to eliminate all means of applying the power of a motor to the wheels of the vehicle, the wheels operating independent of the motor, and thus enabling the construction of a power unit with only a single moving part.

Another novel and useful feature of my device is the ability to stop the vehicle in the shortest possible space without the application of brakes, and reverse the direction of the vehicle at will.

Another important object is to reduce traction on the wheels by the simple expedient of counteracting the weight of the entire machine by a force equal or nearly so, to the attraction due to gravity.

A still further object is the provision of means to intercept the air currents flowing through the device by limiting the amount of air passing therethrough in such manner as to control the horizontal or vertical movement of the vehicle at will.

Other objects, which will become apparent as the description proceeds, reside in the provision of a vehicle that comprises but few simple parts, easy of operation, inexpensively constructed, which when considered individually or collectively must result in the production of a machine whose commercial success is at once assured.

In the drawings:

Fig. 4 is a vertical transverse section taken on the plane of the line 4—4 of Fig. 1 showing the casing in elevation;

Fig. 5 is a similar sectional view taken on the line 5—5 of Fig. 1, showing the rear section of the casing in elevation and a downwardly directed air trunk in section;

Fig. 6 is a detail view showing the means for reversing the direction of rotation of the fan;

Fig. 7 is a modification of my device depicting the use of a slightly different type of fan used in my preferred form, and an attendant modification in the position of certain air trunks;

Fig. 8 is a diagrammatic view showing the action and flow of air currents on a body not equipped with my air trunks and suction means; and Fig. 9 is a similar view showing the action and flow of air currents in and around a body equipped with my air trunks and suction means.

Similar numerals of reference designate like parts throughout the several views.

Figure 1:
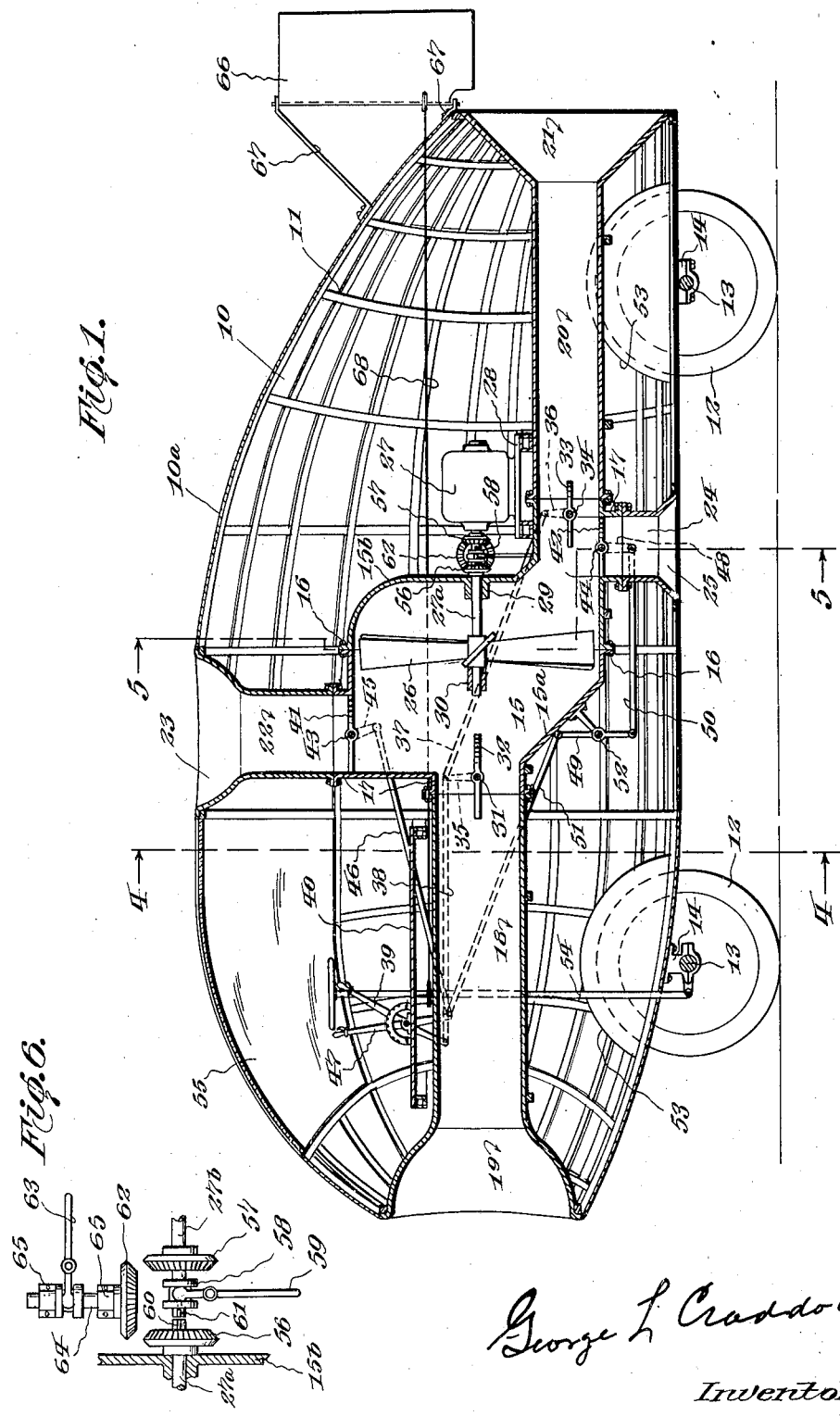
Figure 1 is a central vertical longitudinal section of my invention, showing certain air trunks.
Figure 2:
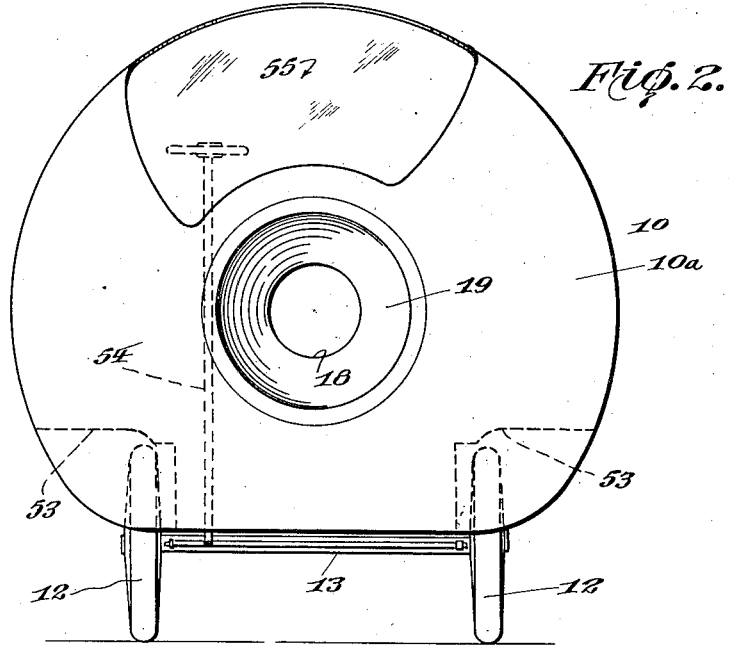
Fig. 2 is a front elevation of the same showing the intake of air.
Figure 3:
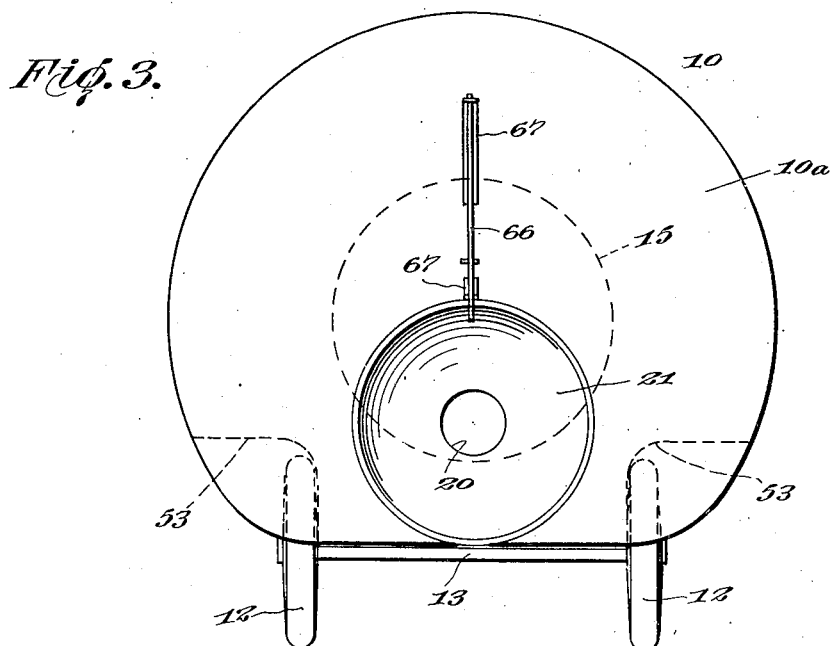
Fig. 3 is a rear elevation showing the flared end of an air trunk.

The numeral 10 designates the body of my vehicle which comprises a suitable skeleton framework 11, covered with fabric 10ᵃ or other suitable material as best practice demands.

By preference, said framework 11, comprising the body 10, is mounted upon wheels 12, on axles 13, and secured to the framework 11, as indicated at 14. A strong and rigid support for the body is thus provided, yet of slender proportions and constructed of light and durable material so as not to unduly increase the weight of the entire device.

Within the body 10 is constructed suitable framework in the form of floors or partitions for the support of certain air trunks and certain mechanisms, all of which will be described hereinafter.

Intermediate the ends of said body 10, is positioned a casing 15, which according to best practice, is composed of two sections 15ª and 15ᵇ suitably bolted together as shown at 16. Said casing 15 is provided with extensions, as indicated at 17, and suitably flanged to receive certain air trunks.

Extending forwardly of said casing 15 is an air trunk 18, preferably circular in cross-section, and having its outer end enlarged and assuming a bowl-shaped configuration, as clearly indicated at 19. A similar air trunk 20 is secured to the rear extension 17 of the casing section 15ᵇ, and extends rearwardly thereof, said air trunk having its outer end flared as indicated at 21. On inspection of the drawings, especially Fig. 1, it will be noted that cross-sectional area of the air trunk 20 is less than that of the air trunk 18.

It is now evident that I have constructed an air trunk which extends longitudinally of said body, from end to end, in a substantially horizontal plane; the casing proper 15, forming a continuation of said air trunk.

Rising from the upwardly directed extension 17, of the casing section 15ª, is another air trunk 22, having its upper end of bowl-shaped configuration, as shown at 23, and similarly a downwardly directed air trunk 24 is secured to the extension 17 of the casing section 15ᵇ. This air trunk is flared at its lower end as indicated at 25.

By inspection of Fig. 1 it will be observed that I have constructed an air trunk extending across the minor axis of said body 10 in a substantially vertical plane, the casing 15 also in this instance forming a continuation of said air trunk. The two sets of air trunks, horizontal and vertical, are, of course, in open communication one within the other.

A fan 26 is positioned within the casing 15 and is operated by any appropriate source of power, which for convenience I have depicted here in the form of an electric motor 27, the latter being firmly anchored to the floor 28 directly above the air trunk 20. As shown in Fig. 1 the motor shaft 27ª is mounted within a bearing 29 in the casing section 15ᵇ, while its forward end is supported by the cross bearing 30 in the casing section 15ª.

It will, of course, be understood that it is highly essential to intercept the air currents passing through the air trunks and to limit the amount of air passing therethrough. To this end I provide valves of the so-called butterfly type which are positioned in the air trunks and operated by means of mechanism which will now be described in detail.

Pivoted on a rod 31, in the front of the casing 15, is a valve 32, which is operated in conjunction with a similar valve 33 located within the rear extension 17 of the casing 15, said valve 33 being pivoted on a rod 34. Each of these rods 31 and 34 are provided with cranks 35 and 36 which are connected by a link 37, while a second link 38, pivoted to the crank 35, extends to the forward portion of the body where it is operatively connected to the lever 39 mounted on the platform 40. In Fig. 1 the valves 32 and 33 are shown in open position so that the air currents have a clear passage through the entire length of the body and in the event it is desired to intercept the air currents passing therethrough it is only necessary to throw said lever 39 forward, the mechanism above described operating to close the valves in unison.

Similarly operated valves 41 and 42 are positioned in the vertical air trunk. In this instance a slightly different method has been employed due to the large diameter of the casing, but the idea of operating them in unison has been adhered to. The valves 41 and 42 are pivotally mounted on rods 43 and 44, the former being provided with a crank 45 and operated by a link 46 pivoted to the lower end of the lever 47 which is also mounted on the platform 40. Rod 44 of valve 42 is also provided with a crank 48 and is connected to a rocker 49 by means of the link 50, the upper end of said rocker 49 being pivotally connected to said lever 47 by means of a link 51. Thus, to open the valves 41 and 42 the lever 47 is thrown back, such movement being communicated to the valve 41 by means of the lever 46 while the link 51 rocks the rocker 49 on its pivot 52 throwing back the link 50 which operates to open the valve 42. By this means the valves in the vertical air trunk are operated in unison.

By reference to Fig. 1, it will be noted that the whole system of valves have been designed to close up the air trunks leading from the casing 15 so as to line-up with the shell of said casing. This method has been adopted in order to obviate any loss of power due to air pockets.

As indicated at 53 throughout the various views, the body 10 is recessed to receive the wheels 12. These recesses will be provided with a cover plate so as not to interrupt the continuity of the sloping sides of said body.

In order to guide the device when operating as a land vehicle I provide a steering mechanism 54 which rises above the platform 40 and is operated therefrom.

A sight opening is also provided as indicated at 55.

As a means of stopping the vehicle, or to suddenly retard its forward motion, I have adopted the simple expedient of reversing the direction of rotation of the fan 26. To this end I have provided means depicted in Fig. 6, wherein the motor shaft has been parted to form two stub shafts 27ª and 27ᵇ, each being provided with gears 56 and 57 which only function during the reversing operation. On the shaft 27ᵇ is slidably mounted a sleeve 58, which when operated by the pivoted lever 59 slides over the tips of the shafts 27ª and 27ᵇ and locks them together by means of the keys 60 and 61. The motor 27 is now directly connected to the fan 26. When it is desired to reverse the direction of the fan 26, the sleeve 58 is retarded thereby freeing the shaft 27ª, whereupon the pinion gear 62 is advanced to mesh with said gears 56 and 57 by means of the lever 63. It will be noted that said gear 62 is mounted on a stub shaft 64 and suitably supported by bearings 65. It will, of course, be understood that in a smaller type of machine the levers 59 and 63 will be operated in unison and connected to suitable mechanism to be controlled from the platform 40.

In order to guide the device when in the air I have provided a rudder 66, suitably mounted on brackets 67 in the rear of the body 10. This rudder will be operated from the steering means 54 by means of the rod 68.

A door 69, (Fig. 4) has been provided so the operator may enter the device and reach the platform 40 by means of a ladder 70, or other suitable means of elevation.

While, of course, it will be understood that a system of storage batteries will be provided to operate the motor 27, it is apparent that advantage may be taken of the force exerted by the velocity of the air currents passing through the air trunks, for the purpose of operating a system for the generation of power to drive said motor.

Figure 7 shows a modified form wherein the fan 71 is of the "squirrel-cage" type. This fan is suitably mounted on a shaft 72, suitably driven from a source of power (not shown) and it will be noted that this type of fan exerts a positive direct pull and expulsion on the air currents in the air trunks 73 and 74. These air trunks have their ends shaped after the fashion of my prefered form and are provided with valves similarly operated. The outline of the body has been shown in broken lines in order to more clearly bring out the relative proportions.

Heretofore in this description, reference has been made to the term "head-on resistance", and by this term I mean the opposition exerted on the motion of a body by existing fluids, due to the cohesion between fluid particles, said resistance being the actual force required to break them apart and thus make room for the moving body. As is well-known, a moving body divides the air-stream, said stream passing around the body and re-uniting in the rear, thereby forming a slight vacuum filled with a complicated whirling mass of air, comprising eddy currents, and technically termed the "drag."

As noted in Figs. 1 and 9, the body of my device, by preference, is of stream-line form so that the air stream will hang closely to the outline through nearly its entire length. Engineers skilled in this art are in accord that this form of structure is the nearest approach whereby the effect of head-on resistance and "drag" may be reduced to a certain extent. However, my device proceeds at this point with the intent and purpose of eliminating the head-on resistance and the rear "drag."

I now call particular attention to the bowl-shaped end of the front air trunk 18, which in general contour is inversely arranged as regards the general configuration of the nose of the body 10. As pointed out hereinbefore the air stream in the older types impacts against the nose of the body then divides and passes all around the surface of the same. In my device the air impacting currents are caught up by the suction produced by the fan 26 and enter the enlarged end, and are then deflected toward the air trunk 18 where they are slightly compressed, then thrown through the rear air trunk 20, and still further compressed and finally released through the flared end of said rear air trunk. This sudden releasing of the air currents and their attendant expansion creates a tremendous propelling power.

It will now become apparent that that portion of an air current generally impacting against the nose of the older structures, is drawn into my device and used as a propelling means instead of a retarding means. It will, of course, be understood that the air stream parted at the nose of my device and which is too remote to be under the influence of the suction of the fan, passes over the surface of the body and tends to re-unite in the rear.

Figures 8 and 9, when considered in conjunction with the above disclosure, should now be clearly understood. In Fig. 8 the small crosses indicated at A shows the impacting forces or what may be called the head-on resistance. At this point the pressure is above the atmospheric. The air stream B divides and passes all around the edges of the body and re-unites at the point C. The region D just between this point C and the rear of the device is filled with a complicated whirling mass of eddy currents, as indicated at E, while the vacuous space at the rear is indicated by the fine dots F. On reference to Fig. 9, it will be noted that the pressure due to the impact of the air particles (indicated at A, Fig. 8) is no longer a source of resistance as these particles are under the influence of the suction created by the fan and their tendency to impact against the curved sides of the bowl-shaped end of the front air trunk is counteracted by said suction. Obviously, head-on resistance at this point is eliminated. The air currents escaping the action of the suction fan pass over the surface of the body and produce only skin friction.

Again referring to Fig. 9, it is apparent that the sudden releasing of the air currents and their attendant expansion must circumvent all tendency of said air currents to re-unite in the rear of the body. Thus, the "drag" which constitutes at least 60% to 70% of the friction, in a device of similar proportions, has been eliminated.

The action of the vertical air trunk is somewhat similar to that of the horizontal trunk. Here the air is drawn in through the flared end of the top air trunk, subjected to compression and discharged through the funnel in the lower air trunk.

When operating my device as a land vehicle, the valves 32 and 33, in the horizontal air trunks, will be opened, permitting the easy passage of the air currents, while the air currents passing through the vertical air trunks may be intercepted entirely or restricted by operating the valves 41 and 42. However, it should not be overlooked that the lifting power by the expulsion of air from said vertical air trunk counteracts the weight of the machine and will be so manipulated to equalize the attraction due to gravity. Obviously, under such conditions, the friction due to traction, which is caused ordinarily by the weight of the machine, is eliminated.

When it is desired to rise from the ground, the horizontal air trunks will be temporarily closed by the valves 32 and 33, while valves 41 and 42 in the vertical air trunks will be opened. The fan, now in operation, will draw the air currents into and discharge them from the latter air trunks and cause the machine to rise. The desired elevation having been reached the valves in the vertical air trunks will be adjusted while the valves in the horizontal air trunks will be opened and the air currents passing therethrough will propel the vehicles in a horizontal direction. Naturally the speed of the device may be regulated by retarding or increasing the speed of the fan and also by the manipulation of the valves.

While there has been illustrated and shown the preferred embodiments of the invention, it is to be understood that the same are merely illustrative of a few of the ways in which the invention may be reduced to practice and such changes and alterations as fall within the scope of the invention and the appended claims may be resorted to liberally when expedient.

Having thus described my invention, I claim as new and desire to secure by Letters Patent:

A device of the character described comprising a body supported by a frame work, an air trunk extending horizontally through said body and having its forward end bowl-shaped and its rear end flared, a similar air trunk extending vertically through said body having its ends flared, a casing intermediate the ends of said air trunks positioned at their intersection thereby forming a continuation of said air trunks, a fan located within said casing for creating an air current through said air trunks and means for intercepting the air currents passing through said air trunks, said means comprising valves operable in pairs, a pair being located in the vertical and horizontal air trunks.

GEORGE L. CRADDOCK.